March 17, 1953     K. T. KELLER     2,631,886
SPARE TIRE MOUNTING
Filed Feb. 23, 1949
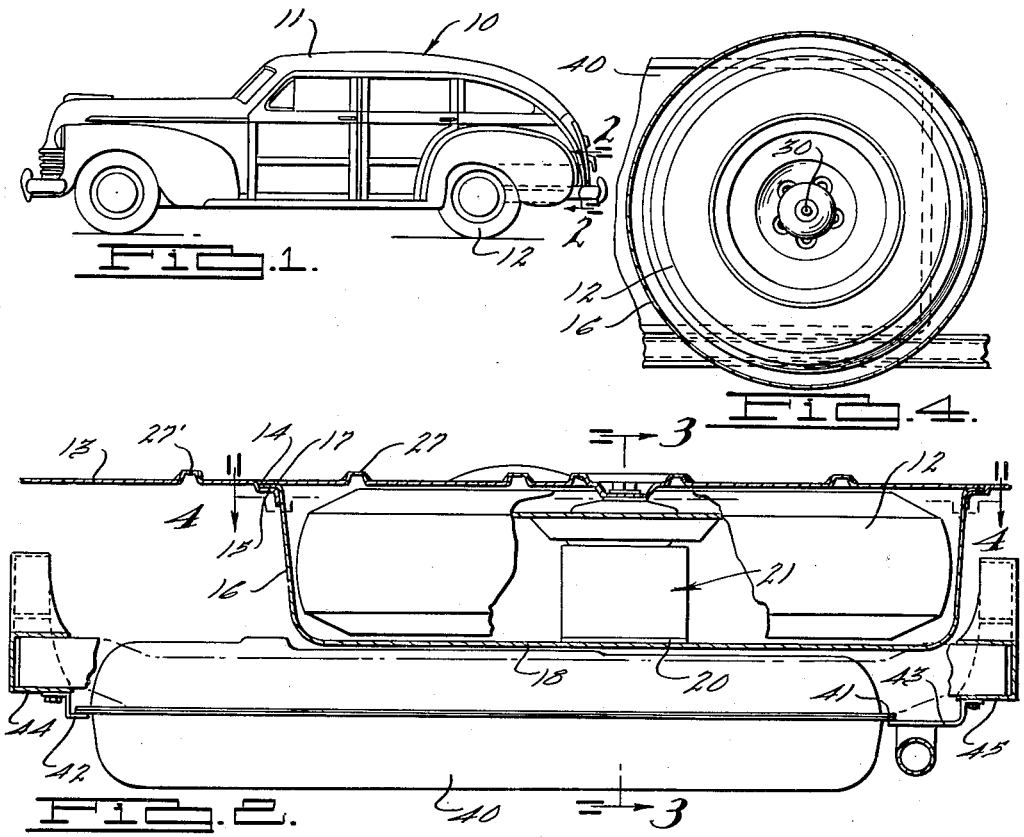
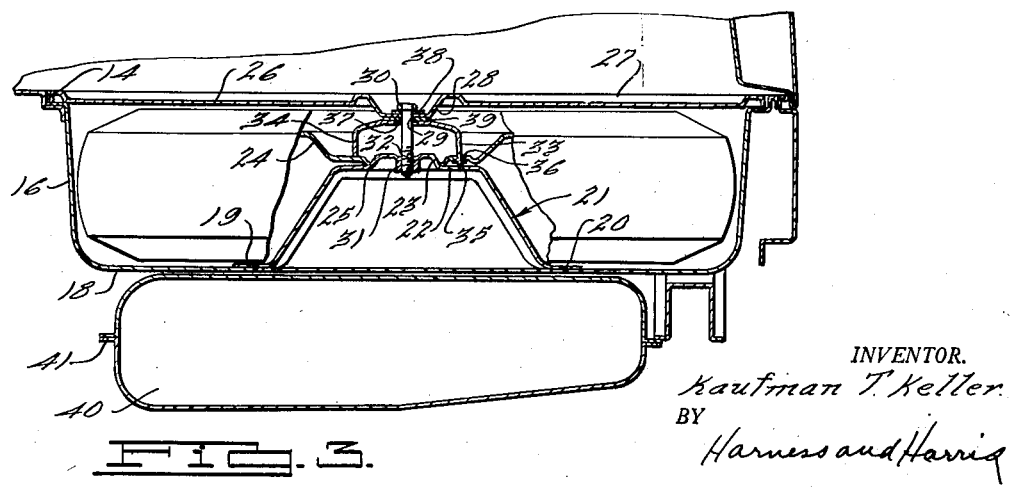
INVENTOR.
Kaufman T. Keller
BY Harness and Harris
ATTORNEYS.

Patented Mar. 17, 1953

2,631,886

UNITED STATES PATENT OFFICE 2,631,886

SPARE TIRE MOUNTING

Kaufman T. Keller, Detroit, Mich., assignor to Chrysler Corporation, Highland Park, Mich., a corporation of Delaware Application February 23, 1949, Serial No. 77,899

2 Claims. (Cl. 296—37.2)

My invention relates to motor vehicles and more particularly to an improved structure for mounting and storing the spare tires of motor vehicles.

The principal object of my invention is to provide a motor vehicle with improved structure for so mounting a spare tire as to increase the effective usable space within the vehicle.

Another object of my invention is to provide a motor vehicle with improved spare tire mounting structure which conceals the tire entirely.

Still another object of my invention is to provide an improved spare tire mounting structure which is sturdy in construction as well as economical to manufacture.

Other objects and advantages will become more apparent from the following description of one embodiment of my invention, reference being had to the accompanying drawings in which:

Fig. 1 is a side elevational view illustrating the general location of my improved spare tire mounting structure.

Fig. 2 is a transverse vertical sectional view of my improved spare tire mounting structure taken on the line 2—2 of Fig. 1.

Fig. 3 is a fragmentary, longitudinal sectional view taken on the line 3—3 of Fig. 2.

Fig. 4 is a fragmentary horizontal sectional view taken on the line 4—4 of Fig. 2.

In the drawings I have shown a motor vehicle generally designated by the numeral 10 which includes conventional structure such as a body 11 and wheels 12. The body 11 is provided with a vehicle floor 13 which has a circular opening 14 adjacent the rear end of the vehicle. The periphery of the opening 14 is depressed to form a shoulder 15 for receiving the open end of a dished or cup-like member 16. The open end of the cup-like member 16 is bent outwardly to form a flange 17 which is carried by the shoulder 15 so that the member 16 depends from the floor 13 forming a well beneath the plane of the vehicle floor. The cup-like member 16 is provided with a floor portion 18 which has secured thereto the free ends 19 and 20 of an inverted U-shaped bracket generally designated by the numeral 21. The bracket 21 extends upwardly from the floor 18 of the cup-like member 16 and the bight portion 22 of the bracket 21 is provided with a raised cylindrical portion 23 for receiving a conventional vehicle spare tire or wheel 24. The wheel 24 is provided with a central circular opening 25, the diameter of which is equal to the diameter of the raised portion 23 so that the portion 23 is receivable within the circular opening 25 and thereby positions the wheel 24 within the cup-like member 16.

The cup-like member 16 is provided with a circular cover 26 of a diameter slightly larger than the diameter of the chamber in the member 16 so that the periphery of the cover 26 rests on the flange 17 which is preferably welded to the depressed shoulder 15 formed in the vehicle floor 13. The cover 26 is provided with ribs 27 which reinforce it and which conform in cross section with and are adapted to be arranged in alignment with ribs 27' in the floor 13. The cover 26 is provided with a centrally located depression 28 which has an aperture 29 for receiving a bolt 30. The bolt 30 is threaded into a nut 31 which is fixed on the underside of the raised cylindrical portion 23 with its threaded hole in alignment with a centrally located opening 32 therein. The nut 31 is fixed against rotation with respect to the raised portion 23 so that the bolt 30 may be threaded into the nut without the use of a wrench or other retaining means.

An inverted cup-like spacer 33 is disposed between the cover 26 and the wheel 24 and has its open cylindrical end 34 engaging the wheel. The open end 34 is provided with extensions 35 which are received within the conventional threaded openings 36 disposed around the opening 25 of the wheel 24 which are normally used to bolt the wheel 24 into its operating position when the wheel is placed on the spindle or axle of a vehicle. In this manner, the projections 35 which extend axially from the open end of the spacer 33 prevent any rotation of the wheel 24 while it is disposed within the cup-like member 16. The end wall of the spacer 33 is provided with an opening 37 which receives the bolt 30 while the cover 26 urges the spacer 33 against the wheel 24 in response to movement of the bolt 30 when it is threaded into the nut 31. The bolt 30 is provided with washers 38 and 39 disposed between the head of the bolt and the depression 28 and between the depression 28 and the spacer 33, respectively, to prevent undue wear on the respective parts. By storing the wheel 24 below the plane of the vehicle floor a great deal of space above the floor normally consumed by this wheel is conserved.

A gas tank 40 may be conveniently lowered to accommodate the storage of the wheel in the position as shown by merely welding the peripheral flange 41 of the tank to brackets 42 and 43 which are secured to side rails 44 and 45, respectively. The gas tank 40 may be of desired shape and may be readily constructed and arranged to accommodate my improved spare tire and wheel assembly mounting construction. To remove the vehicle wheel 24, the bolt 30 is withdrawn from the nut 31 by conventional rotation and the cover 26 as well as the spacer 33 is easily removed. Thereafter the wheel 24 may be conveniently lifted from its position on the bracket 21 and may be replaced in a like manner.

It may be readily seen that my improved structure affords greater utility to the modern motor vehicle. The interior contour of the vehicle is not obstructed by the appearance of a spare tire mounted therein and much more room is afforded to vehicles which normally carry their spare tire within the vehicle.

The construction employed permits the use of a single control for holding the tire in place as well as holding the cover over the well. Therefore, when the bolt 30 is removed, the cover as well as the tire are free to be moved.

While I have illustrated and described but one embodiment of my invention, it is to be understood that such is for the purpose of illustration only, and it is contemplated that those skilled in the art may modify certain details without departing from the spirit or scope of the invention as defined in the claims appended hereto.

I claim:
1. In combination with a vehicle including a floor portion having an opening therein and a vehicle wheel having a hole therein, structure for carrying said wheel comprising an open ended cup-like member depending from said floor portion beneath said opening and having its open end secured to said floor portion, a bracket secured to said member and carrying said wheel, a cover disposed over said opening in substantially the plane of said floor portion, an inverted cup-like element disposed between said wheel and said cover and having a projection disposed within the hole in said wheel for resisting rotational movement of said wheel, and retaining means operatively connected between said bracket and said cover and securing said cover over said opening, said retaining means securing said wheel between said inverted cup-like element and said bracket.

2. In combination with a vehicle including a floor portion having an opening therein and a vehicle wheel having a centrally located opening with a hole adjacent thereto, structure for carrying said wheel comprising an open ended cup-like member depending from said floor portion beneath said opening and having its open end secured to said floor portion, a bracket secured to said member and having a raised cylindrical portion receivable in said wheel opening for supporting and positioning said wheel, a cover disposed over said opening in substantially the plane of said floor portion, an inverted cup-like element disposed between said wheel and said cover and having a projection disposed within the hole in said wheel for resisting rotational movement of said wheel, and retaining means operatively connected between said bracket and said cover for securing said cover over said opening and for securing said wheel between said inverted cup-like element and said bracket.

KAUFMAN T. KELLER.

REFERENCES CITED

The following references are of record in the file of this patent:

UNITED STATES PATENTS

| Number | Name | Date |
|---|---|---|
| Re. 21,171 | Biszantz | Aug. 8, 1939 |
| 1,318,694 | Roesch | Oct. 14, 1919 |
| 2,094,328 | Lyon | Sept. 28, 1937 |
| 2,118,596 | Fergueson | May 24, 1938 |

FOREIGN PATENTS

| Number | Country | Date |
|---|---|---|
| 56,831 | Norway | July 13, 1936 |